No. 613,803. Patented Nov. 8, 1898.
A. W. KNIGHT.
CARRIAGE GEAR.
(Application filed Dec. 28, 1897.)
(No Model.)
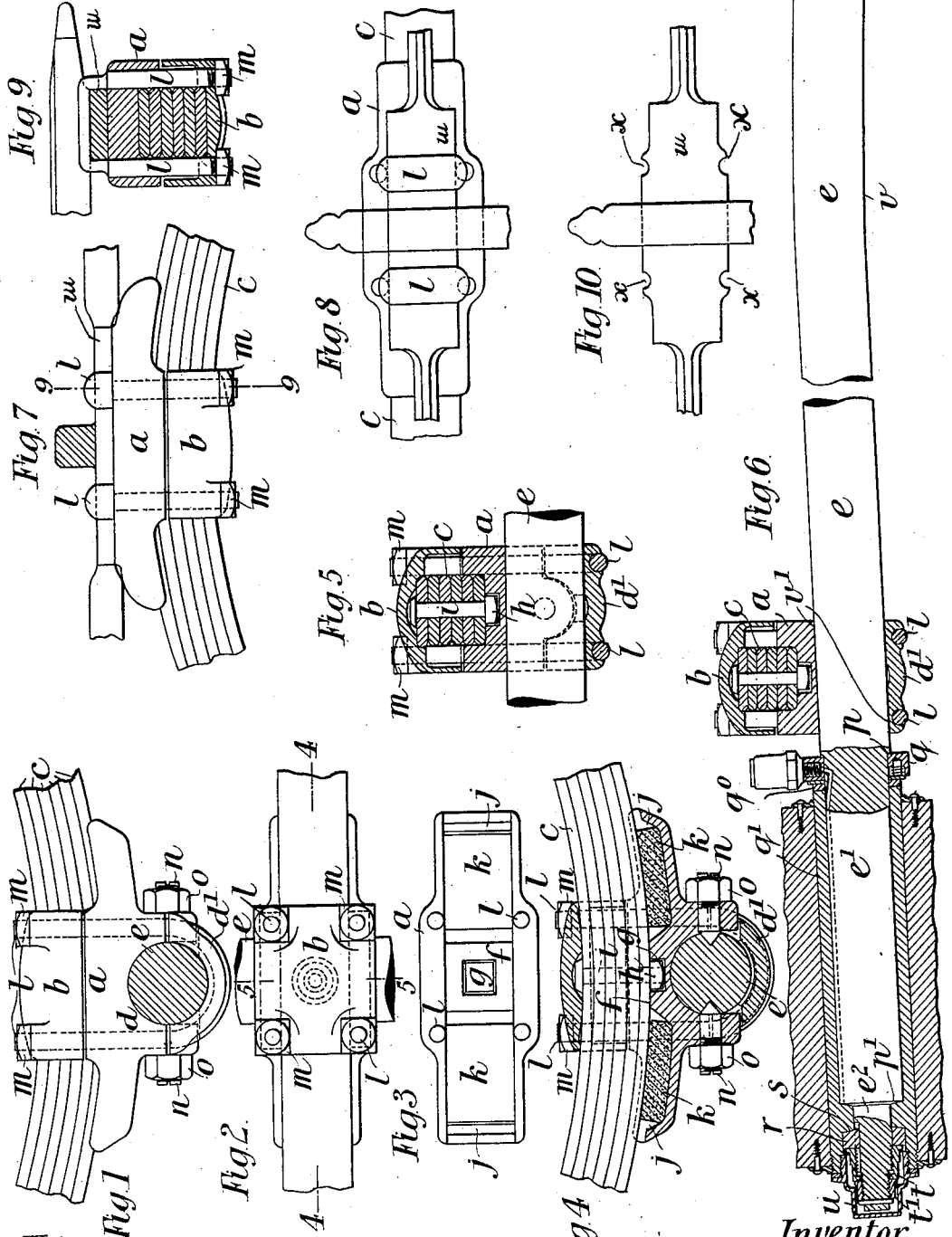
Witnesses
Halbert Smith
A. T. Hood
Inventor
Alfred William Knight
By John J. Halsted & Son
their Attys.

UNITED STATES PATENT OFFICE.

ALFRED WILLIAM KNIGHT, OF CUCKFIELD, ENGLAND.

CARRIAGE-GEAR.

SPECIFICATION forming part of Letters Patent No. 613,803, dated November 8, 1898.

Application filed December 28, 1897. Serial No. 663,881. (No model.)

*To all whom it may concern:*

Be it known that I, ALFRED WILLIAM KNIGHT, a subject of the Queen of Great Britain, residing at Cuckfield, in the county of Sussex, England, have invented new and useful Improvements Applicable to Carriages for Common Roads, (for which I have obtained a patent in Great Britain, No. 17,842, dated September 19, 1894,) of which the following is a specification.

My invention relates to carriages for common roads, and has for its chief object to provide improved means for connecting the axles and springs.

Hitherto it has been usual to arrange india-rubber or other cushions between the springs and flap-irons on the axle, clips or stirrups being passed over the springs and flap-irons to connect the springs. This arrangement, however, has the disadvantage that when the carriage is loaded the springs are so compressed that the clips are loosened. Now according to my invention I obviate this objection by dispensing with the usual flaps and making use of a specially-constructed metal cushion-case having among its features a bracket portion of the same for the axle, the axle preferably being formed circular in section. The cushion-case has at the center a solid non-cushioned metal bearing for the spring to rest upon, and the two end portions of the cushion-case are recessed to hold elastic cushions which receive the vibration of the springs. This combined cushion-case and bracket is fixed to the spring and the axle by means of clips arranged so close together as to hold that part of the spring resting upon the solid bearing.

It will be obvious that my cushion-case can be applied with equal advantage upon the top of a spring.

To enable my invention to be fully understood, I will describe how it can be carried into practice by reference to the accompanying drawings, in which—

Figures 1 and 2 are respectively a side elevation and a plan of a portion of a spring and axle of a carriage for common roads connected together according to my invention. Fig. 3 is a plan of the lower part of my combined cushion-case and bracket. Figs. 4 and 5 are respectively sections on the lines 4 4 and 5 5, Fig. 2. Fig. 6 is a sectional elevation of my cushion-case with a special axle and axle-box. Figs. 7 and 8 are respectively a side elevation and a plan illustrating the cushion-case and bracket adapted so as to connect the top of a spring to a futchell-iron or the like; and Fig. 9 is a section on the line 9 9, Fig. 7. Fig. 10 is a plan of a futchell-iron adapted to my cushion-case or bracket.

$a$ is my cushion-case, which is provided with a cap or removable part $b$, designed, in conjunction with the part $a$, to embrace the spring $c$.

In the arrangement of my invention shown in Figs. 1 to 5 the cushion-case is formed with a bracket $d$, integral therewith and deeply grooved transversely for the axle $e$ and provided with a cap $d'$, by means of which the axle is held in the bracket, the said axle, as shown, being circular in cross-section.

$f$ is the bearing at the center of the cushion-case $a$, upon which the spring $c$ rests, and $g$ is a recess in the said bearing to receive the nut $h$ on the usual center-bolt $i$ of the spring, the said recess serving, in conjunction with the bolt-head, to prevent the movement of the spring relatively with the cushion-case. The said recess is advantageously made of a shape corresponding with that of the said nut, so as to prevent the latter from working loose on the bolt $i$.

$j\ j$ are the longitudinal recesses or grooves in the ends of the case $a$ and at each side of the center bearing $f$, and $k\ k$ are the elastic cushions in the said recesses, which receive the vibrations of the spring. When not so acted upon by the movements of the spring, these cushions are in their normal state and not compressed.

$l\ l$ are the clips for holding the spring $c$ and axle $e$ in the cushion-case and bracket, the said clips being one on each side of the spring and each in the form of a staple, the curved part of which is located in a correspondingly-shaped groove in the cap $d'$, while the legs pass up, one on each side of the axle $e$, through holes in the case $a$ and cap $b$, nuts $m\ m$ being screwed onto the legs to hold the parts together.

$n\ n$ are set-screws passing through the bracket and into holes formed in the axle $e$, whereby the latter is prevented from moving endwise and rotating in the said bracket. $o$ $o$ are lock-nuts upon the said screws $n$ $n$ for locking them in position.

By the use of the described combined cushion-case and bracket in conjunction with a circular axle I am enabled to set or tilt the springs at any angle with more facility than heretofore, and the bracket being movable upon the axle enables me to fix the springs at exactly the required distance apart. Also by the use of the center solid bearing $f$ the usual wooden spring-block is dispensed with and the elastic cushions extend to near the center of the support or bearing of the spring, thus allowing the spring a greater length for vibration than heretofore.

A further advantage of my invention is that I am enabled to use round axles with plain-turned ends and thereby dispense with the necessity for any forging. Such an axle is shown in Fig. 6 and is made by turning down the portion $e'$ of the axle $e$ to form the shoulder $p$ and further reducing the diameter of the portion $e^2$ to form the shoulder $p'$. Against the shoulder $p$ is shrunk or otherwise fixed the collar $q$ upon a spring-washer $q^0$, against which a bush $q'$, fixed in the wheel-hub, rubs to exclude dust. A cone $r$ on the part $e^2$ fits against a corresponding conical shoulder $s$ on the outer end of the bush $q'$, nuts $t$ $t'$, screwed onto the ends of the axle, serving to hold the said cone $r$ in position. $u$ is a cap screwed into the bush $q'$ for covering the end of the axle. The desired rake or angle which the wheels are to have relatively to the perpendicular can be given by more or less bending the axle at the center, as indicated at $v$, Fig. 6, and correspondingly forming the holes in the brackets through which the axle passes, as indicated at $v'$, Fig. 6.

Instead of using a solid axle $e$, as hereinbefore described, I may use a tube having solid pins fixed into its ends.

It will be understood that the axle instead of being fixed in the cushion-case can rotate therein, in which case the said axle will be formed straight.

In adapting my cushion-case to the top of a spring, as shown in Figs. 7 to 10, the bracket $d$ is dispensed with and the clips $l$ $l$ are placed so as to embrace the spring and the ordinary futchell-iron $w$ (or the like) to which the spring is secured.

As the futchell-iron shown in Figs. 7 to 9 is only secured against longitudinal movement by friction with the top of the cushion-case, I sometimes, as shown in Fig. 10, form recesses $x$ $x$ in the said plate, in which the legs of the clips $l$ $l$ are located, thereby securing the said plate against such movement.

Having now particularly described and ascertained the nature of my said invention and in what manner the same is to be performed, I declare that what I claim is—

1. The described metallic cushion-case support for carriage-springs, having the following characteristics, namely: a central metal bearing for the center of the spring, a cushion, and a bracket projection having therein a deep transverse groove adapted to receive a cylindrical axle.

2. In combination with the described cushion-case having the central bearing recessed as set forth, and having the lateral recessed projections, and grooved bracket, the elastic cushions, the upper and lower removable caps, the spring, and suitable clips for holding the spring and axle in the case and bracket, all substantially as and for the purposes set forth.

3. In a carriage for common roads, the combination with its spring and axle, of a cushion-case and bracket in one piece and provided with a cap for holding and clipping the axle to the bracket, the bracket and cap being transversely grooved to receive a cylindrical axle, the combination also allowing of tilting the springs and also of moving and fixing them upon the axle at the required distance apart.

4. In combination, a carriage spring and axle connected together by means of the device $a$ $d$ $f$, comprising a case having longitudinal recesses $j$ for cushions, a transversely-grooved bracket for the axle, and a central bearing for the spring, elastic cushions in said recesses $j$ extending to near the center of the case, and a central recess in the bearing for receiving the nut of the center-bolt and permitting the spring to rest directly on the metal bearing, all substantially as set forth.

5. In combination with the cushion-case having the bracket $d$ made as described with a central recessed bearing $f$, an axle cylindrical in cross-section and adapted for a transverse groove in the bracket, and also having reduced turned ends, all substantially as set forth.

6. In a carriage for common roads, the combination with a futchell-iron or the like, of the spring, the cushion-case $a$ and its cap $b$, all as set forth.

ALFRED WILLIAM KNIGHT.

Witnesses:
G. F. REDFERN,
JOHN E. BOUSFIELD.